No. 796,167. PATENTED AUG. 1, 1905.
H. C. WAITE.
EMERGENCY TIRE.
APPLICATION FILED SEPT. 12, 1904.
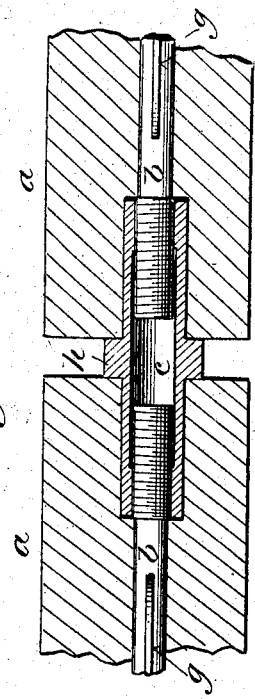
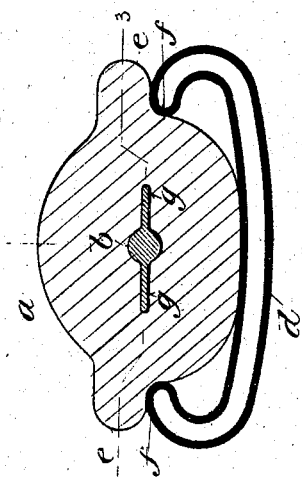
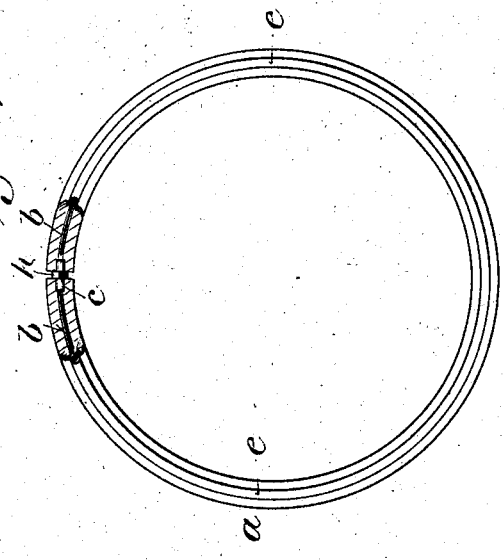
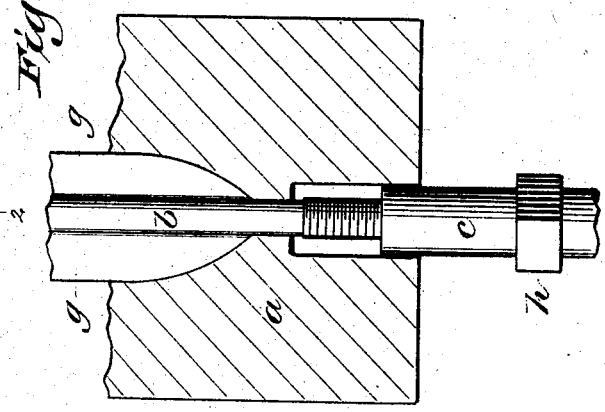
Witnesses:
Geo. W. Young
Chas. L. Goss
Inventor:
Harry C. Waite,
By Winkler Flanders Smith Bottum & Vilas
Attorneys.

UNITED STATES PATENT OFFICE.

HARRY C. WAITE, OF MILWAUKEE, WISCONSIN, ASSIGNOR OF ONE-EIGHTH TO GEORGE H. ATKINS AND ONE-FOURTH TO RALPH F. MAYHEW, OF MILWAUKEE, WISCONSIN.

EMERGENCY-TIRE.

No. 796,167.        Specification of Letters Patent.        Patented Aug. 1, 1905.

Application filed September 12, 1904. Serial No. 224,063.

*To all whom it may concern:*

Be it known that I, HARRY C. WAITE, a citizen of the United States, residing at Milwaukee, in the county of Milwaukee and State of Wisconsin, have invented a new and useful Emergency-Tire, of which the following is a specification, reference being had to the accompanying drawings, forming a part thereof.

This invention relates particularly to automobiles or vehicles designed to use pneumatic tires. Its main object is to provide a temporary tire which can be readily applied to a wheel in place of a punctured or otherwise disabled pneumatic tire, which will protect the wheel-rim from injury, afford traction, and generally serve the purpose of the regular inflated tire in cases of emergency.

It consists in certain novel features of construction and in the peculiar arrangement and combinations of parts hereinafter particularly described, and pointed out in the claims.

In the accompanying drawings like letters designate the same parts in the several figures.

Figure 1 is a cross-section of a tire embodying my invention in connection with a wheel-rim. Fig. 2 is a longitudinal section on the line 2 2, Fig. 1, of the end portions of the tire and the adjustable fastening for contracting and securing it upon a wheel-rim. Fig. 3 is a longitudinal section on the line 3 3, Fig. 1, showing one end of the tire and a portion of the adjustable fastening; and Fig. 4 is a side elevation, on a reduced scale, of a complete tire, the ends next to the adjustable fastening being shown in section.

The tire consists of a severed elastic or cushion ring $a$, having a strengthening-core $b$ passing longitudinally through it and a fastening $c$ for drawing the ends together and contracting the tire upon a wheel-rim. The elastic or cushion ring $a$ may be constructed of rubber, of rubber and canvas combined, or of any other suitable material or materials. It is preferably made of approximately round or oval shape in cross-section, as shown in Fig. 1, to fit into and bear against the rim $d$ of a wheel between the inturned edges or the flanges to which the ordinary inflated or pneumatic tire is attached. It is preferably formed on the sides with ribs or shoulders $e$, which project over the edges or flanges $f$ of the rim and protect them from injury when the temporary tire is applied to the wheel.

The severed cushion-ring is reinforced and sufficient tensile strength given thereto to permit of its being contracted upon a wheel-rim with sufficient force to hold it securely in place thereon by the core $b$, which consists, as shown, of a flexible metal rod reversely threaded at the ends and formed with lateral fins $g$, which are embedded in the substance of the elastic ring $a$ and prevent it from turning and becoming loose therein, giving it stability and holding the parts securely in place together without materially reducing the flexibility of the tire. The adjustable fastening for drawing the ends of the tire together and contracting it upon a wheel-rim consists, as shown, of a right and left threaded sleeve-nut fitted to engage the reversely-threaded ends of the rod or core $b$ and formed with a squared and enlarged wrench-head $h$ for turning it and keeping the ends of the elastic ring $a$ separated to admit of the insertion of a wrench between them.

In case the regular pneumatic tire is punctured or injured so that it cannot be readily repaired for immediate use it is removed from the wheel and the temporary tire herein shown and described is spread and placed upon the rim. The right and left threaded nut $c$ is then engaged with the ends of the rod $b$ and turned to draw the ends of the tire together and contract it tightly upon the rim. This can be easily and quickly accomplished and when done the wheel is ready for use and may be run without injury to the rim.

Various changes in minor details of construction and arrangement of parts may be made without departing from the principle and intended scope of the invention.

I claim—

1. An emergency-tire consisting of a severed elastic or cushion ring having a flexible strengthening-rod passing longitudinally through it and formed with lateral fins which are embedded in the substance of said ring, and means for drawing the ends of said ring together and securing it upon a wheel-rim, substantially as described.

2. An emergency-tire consisting of a severed elastic or cushion ring provided with a strengthening-rod passing longitudinally through it and reversely threaded at the ends, and a right and left threaded sleeve-nut adapted to engage the threaded ends of said rod and to contract and secure the tire upon a wheel-rim, said nut having an enlarged wrench-head adapted to hold the ends of the elastic ring apart to admit of the insertion of a wrench between them for putting the tire on and taking it off from the wheel-rim, substantially as described.

In witness whereof I hereto affix my signature in presence of two witnesses.

HARRY C. WAITE.

Witnesses:
G. H. ATKINS,
BERNARD C. ROLOFF.